(12) United States Patent
Wheatley

(10) Patent No.: US 6,673,409 B1
(45) Date of Patent: Jan. 6, 2004

(54) FRICTIONAL HOLDING PAD

(75) Inventor: Alan J. Wheatley, Draper, UT (US)

(73) Assignee: American Covers, Inc., Draper, UT (US)

( * ) Notice: Subject to any disclaimer, the term of this patent is extended or adjusted under 35 U.S.C. 154(b) by 0 days.

(21) Appl. No.: 10/209,948

(22) Filed: Jul. 30, 2002

Related U.S. Application Data

(60) Provisional application No. 60/344,571, filed on Dec. 28, 2001, and provisional application No. 60/308,955, filed on Jul. 31, 2001.

(51) Int. Cl.$^7$ ................................................ B32B 3/30
(52) U.S. Cl. .................... 428/40.1; 296/97.3; 296/97.7; 296/97.9; 428/41.3; 428/41.5; 428/42.1; 428/131; 428/137; 428/147; 428/156; 428/158; 428/160; 428/192; 428/194; 428/922
(58) Field of Search ............................... 428/40.1, 42.1, 428/131, 192, 194, 41.3, 41.5, 156, 137, 141, 158, 160, 922; 296/97.3, 97.7, 97.9

(56) References Cited

U.S. PATENT DOCUMENTS

| | | |
|---|---|---|
| 2,128,118 A | 8/1938 | Burford |
| 2,466,502 A | 4/1949 | Stiller |
| 2,642,248 A | 6/1953 | Semon |
| 3,654,047 A | 4/1972 | Berkowitz |
| 4,749,222 A * | 6/1988 | Idland .......................... 296/97 |
| 4,944,311 A | 7/1990 | Eldridge, Jr. et al. |
| 5,036,866 A | 8/1991 | Eldrige, Jr. et al. |
| 5,358,094 A * | 10/1994 | Molinaro ..................... 40/524 |
| 5,638,249 A * | 6/1997 | Rubino ........................ 361/225 |

* cited by examiner

*Primary Examiner*—Nasser Ahmad
(74) *Attorney, Agent, or Firm*—Thorpe North & Western, LLP

(57) ABSTRACT

A frictional holding pad for removably attaching items, such as a cell phone, to a surface, such as a dash, to allow storage of items on the pad to prevent the items from shifting or sliding due to the movement of the support surface. A bottom surface of the pad is tacky to cling to the surface and a top surface is tacky to cling to the item. A lowermost contact surface of the pad can have a greater surface area than an uppermost contact surface. Indicia can be formed on the pad. The pad can be translucent or transparent. The pad can include an expanded vinyl material or a polyurethane material.

29 Claims, 3 Drawing Sheets

FRICTIONAL HOLDING PAD

The benefit of U.S. Provisional Patent Application Nos. 60/308,955, filed Jul. 31, 2001, and Ser. No. 60/344,571, filed Dec. 28, 2001, is claimed.

BACKGROUND OF THE INVENTION

1. Field of the Invention

The present invention relates generally to a frictional holding pad or material, particularly useful to releasably secure an object from movement in a vehicle. More particularly, the present invention relates to an expanded vinyl frictional holding material configured to non-chemically adhering to a planar or contoured support surface.

2. Related Art

It is often desirable to non-permanently adhere a first object to a second object, but retain the option of removing the first object without damaging either object. Conventional adhesive devices, however, often utilize a chemical bond that is permanent in nature so that removal of the adhesive device either damages the object on which it was used, or leaves a residue on the object that is difficult to remove without damaging the object. Similarly, mechanical retaining devices often are mounted to an object in such a way as to permanently alter the object. There are also magnetic devices in which two pieces are glued to the dash and phone, and then magnetically couple together.

Additionally, many items carried in day-to-day life must often be temporarily stored to free an individual's hands for other tasks. One common example of such a situation arises when an individual enters a vehicle. Items such as cell phones, personal digital assistants, writing instruments or glasses must be stored in order to free the hands of the individual so that he or she may operate the vehicle. In many cases, however, an individual may wish to have ready access to the items should the items be quickly needed, for instance if a call is received on the cell phone. Because most vehicles involve stop-and-go or side-to-side motion, placing such items on, open surfaces raises the risk that the items will slide off the open surface during operation of the vehicle. The movement of such items can cause damage to the item itself, damage to the vehicle or interior accessories, and posses a safety problem. For example, a cell phone may break if it falls to the floor, or may fall onto another object, such as a laptop computer, causing further damage. In addition, a driver may be distracted by trying to retrieve the phone from the floor. Hence, storing such items on open surfaces is generally not a viable option.

While most vehicles include storage locations for such personal items, storing the items generally requires the inconvenience of opening a compartment, such as a glove box in an automobile, and storing the items along with the other items already contained within the compartment. Once stored in such compartments, items are not visible to an individual and are not easily accessible should the individual wish to quickly access the items.

Various solutions to the problem have been proposed. Most notably, special mounting devices have been used to secure items in the car. Such mounting devices typically have a base that is secured to some object in the vehicle, and a receiving portion to receive and hold the item. For example, some devices are configured to receive and hold a cell phone. Other devices are configured to receive and hold sunglasses. One disadvantage with such mounting devices is that they are typically customized to hold a particular item, or type of item, and are ill suited for other items. For example, a mounting device for a cell phone may not adequately hold sunglasses. Thus, it may be necessary to have several mounting devices within the vehicle, one for a cell phone, one for sunglasses, one for a GPS unit, etc. One disadvantage with having several mounting devices is that the vehicle appears cluttered. In addition, such mounting devices are typically sold as accessories, and thus add expense. Another disadvantage with such mounting devices is that they can permanently alter and devalue the vehicle.

SUMMARY OF THE INVENTION

It has been recognized that it would be advantageous to develop a system and method to releaseably secure items to a surface without permanently altering the surface. In addition, it has been recognized that it would be advantageous to develop a system and method to releaseably secure items to a surface in a vehicle without permanently altering the vehicle surface, and allowing for ready retrieval of the object. In addition, it has been recognized that it would be advantageous to develop such a system and method capable of being used with various different items. In addition, it has been recognized that it would be advantageous to develop such a system and method capable of providing advertisement, and/or personalization or customization.

The invention provides a frictional holding device configured to be disposed on a vehicle or other surface and to receive and secure an item thereon. The device includes a pad with a bottom disposed on the vehicle surface, and a top to removably receive the item thereon. The top has an uppermost contact surface to contact and frictionally cling to the item. The bottom has a lowermost contact surface to contact and frictionally cling to the vehicle surface. The lowermost contact surface has a greater surface area than the uppermost contact surface. Thus, the pad can cling with greater force to the surface of the vehicle while an item is removed from the pad.

In accordance with a more detailed aspect of the present invention, the pad can be bendable and includes a flexible material to conform the pad to changes in the vehicle surface.

In accordance with another more detailed aspect of the present invention, the bottom surface of the pad can be substantially flat, while the top surface can include a plurality of indentations and protrusions. The protrusions can have an upper surface area to form the uppermost contact surface. Thus, the protrusions can form the greater surface area for the bottom surface. The top surface of the pad can be less tacky than the bottom surface so that an item can be removed without removing the pad from the vehicle surface. The bottom surface of the pad can be smoother than the top surface to improve the tackiness or cling of the bottom surface.

In accordance with another more detailed aspect of the present invention, a plurality of holes can be formed around at least a portion of a perimeter of the pad. The holes can give the appearance of a seam.

In accordance with another more detailed aspect of the present invention, indicia can be formed on the pad. The indicia can include a logo, an advertisement, an instruction, a promotion, a company name, or a product name. The top surface of the pad can include at least two sections. A first section can be substantially flat and can have the indicia thereon. A second section can be contoured to receive the item thereon.

In accordance with another more detailed aspect of the present invention, a removable backing layer can be removably coupled to the bottom surface of the pad. A removable wrapper can be formed around the pad and the backing layer. The removable backing layer can resist the bottom surface of the pad from coupling to the wrapper.

In accordance with another more detailed aspect of the present invention, the pad can include an expanded vinyl material. In accordance with another more detailed aspect of the present invention, the pad can include a molded polyurethane material.

In accordance with another more detailed aspect of the present invention, at least a portion of the pad can be at least translucent. Thus, details of the vehicle surface can be viewed through the pad. Indicia can be formed on the bottom surface of the pad, and can be visible through the at least a portion of the pad that is at least translucent. Thus, the pad can protect the indicia.

Additional features and advantages of the invention will be apparent from the detailed description which follows, taken in conjunction with the accompanying drawings, which together illustrate, by way of example, features of the invention.

DETAILED DESCRIPTION

Figure 1:
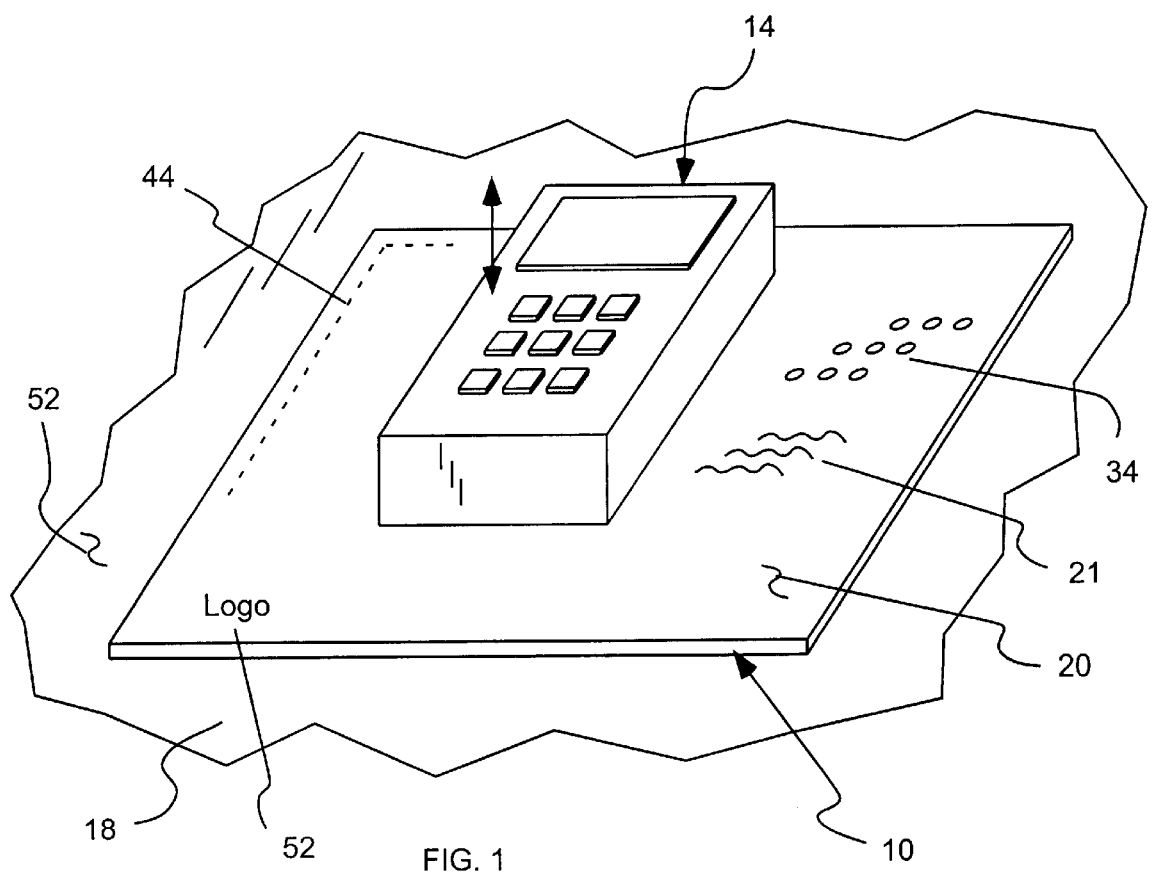
FIG. 1 is a perspective view of a frictional holding pad in accordance with an embodiment of the present invention, shown disposed on a dashboard of a vehicle and with a cellular phone disposed thereon.
Figure 2:
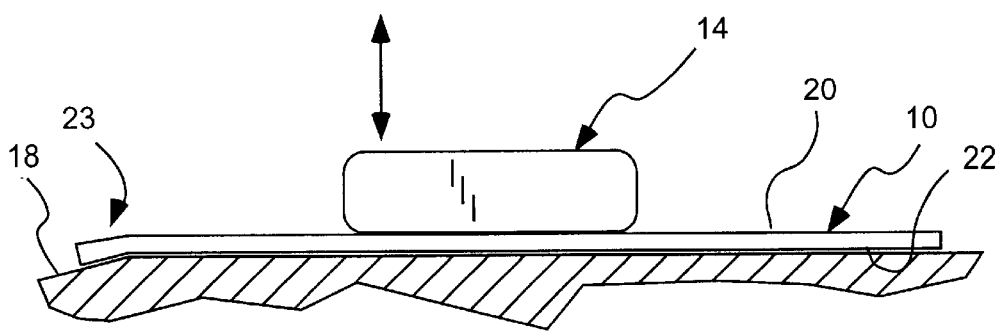
FIG. 2 is a cross-sectional view of the frictional holding pad of FIG. 1.
Figure 3:
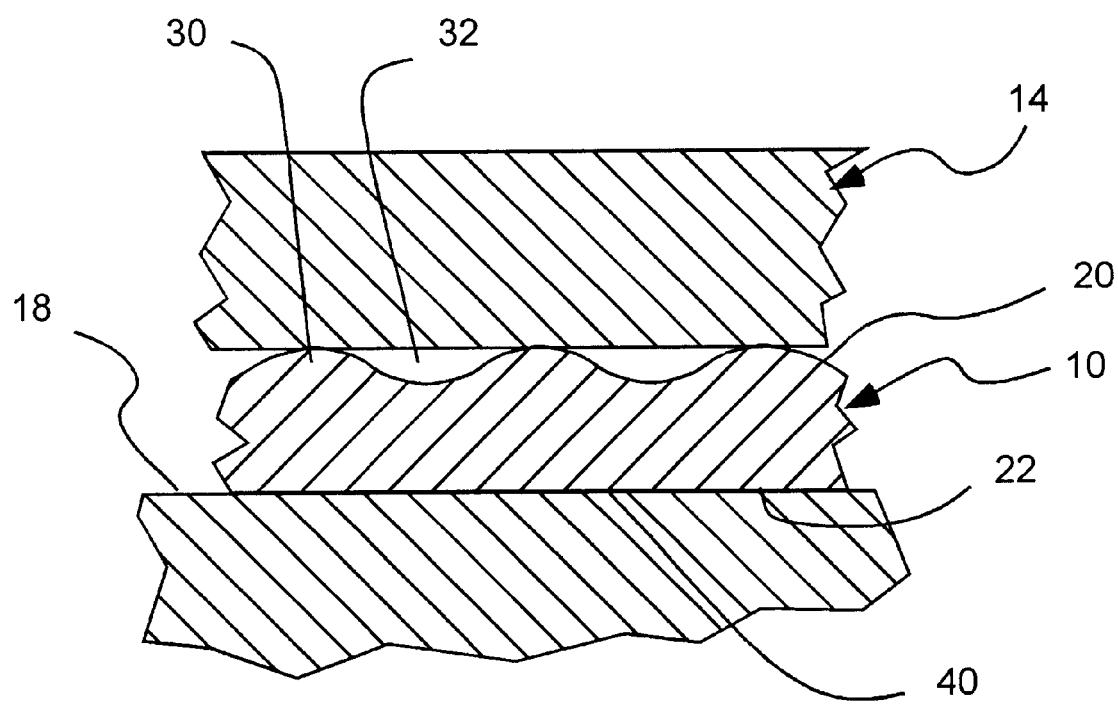
FIG. 3 is a detailed, partial cross-sectional view of the frictional holding pad of FIG. 1.
Figure 4:
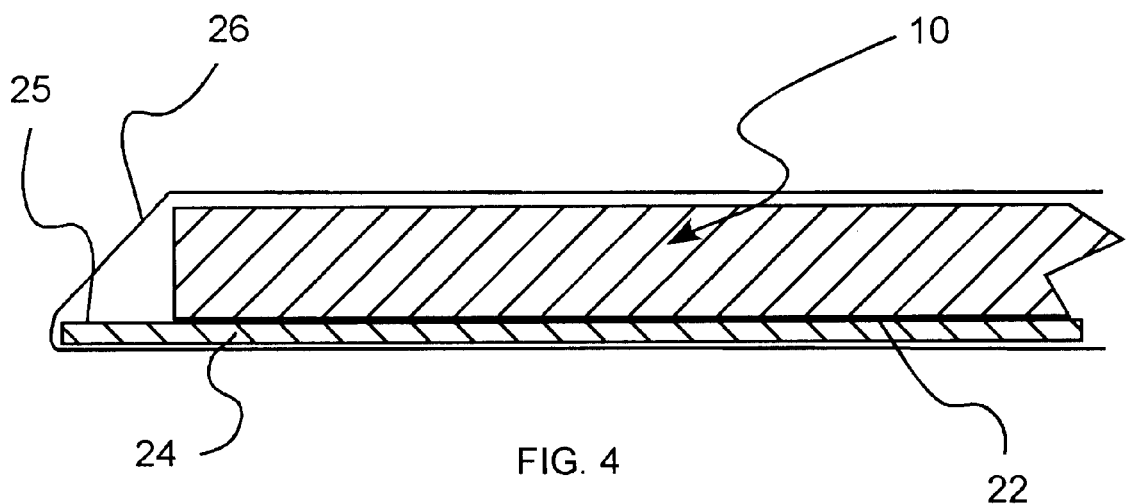
FIG. 4 is a detailed, partial cross-sectional view of the frictional holding pad of FIG. 1 with a release layer and a wrapper in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1–5, a frictional holding pad, indicated generally at 10, in accordance with the present invention is shown for releasably retaining, or selectively maintaining, an item 14 on a surface 16. The pad 10 is disposed on the surface 16, and receives the item 14 thereon. The surface 16 can be planer or curved, and can include a dashboard or console of a vehicle. The item 14 can be any of a number of items, including for example, a cell phone, a personal digital assistant (PDA), a writing instrument, such as a pen or pencil, a pair of sunglasses, a pair of eye glasses, a global positioning system (GPS), a radio, a two-way radio, a citizens band (CB) radio, a walkie-talkie, a camera, a video recorder, a cassette player/recorder, a mini-cassette recorder, a DVD player, a mini-disk player, a portable television (TV), etc. Securing personal items in a vehicle is one field that may benefit from use of the present invention. It will be appreciated that other items can be selectively secured to the surface 16 by the pad 10. In addition, it will be appreciated that the pad can be disposed on other surfaces.

The frictional holding pad 10 has an upper or uppermost surface 20 and a lower surface 22. The upper surface 20 is holds one or more objects 14 securely in place despite movement of the surface 16 or vehicle. The lower surface 22 is disposed on and grips the surface 16. The lower surface 22 of the frictional holding pad 10 can be "tacky", such that the pad 10 tends to cling to the surface 16 in a mechanical fashion, as opposed to a chemical or adhesive manner. The lower surface 22 also can be smoother than the upper surface 20, or have a more shiny appearance.

In addition, the lower surface 22 can have a greater surface area in contact with the surface 16 to provide a greater frictional engagement. The upper surface 20 can have less surface area in contact with the object 14 to provide less frictional engagement. Thus, the pad 10 remains on the surface 16 when the object 14 is removed, rather than removing the pad from the surface while the object is removed from the pad. The upper surface 20 can have contours or texture (indicated at 21) formed thereon to reduce the surface area of the upper surface 20 in contact with the item 14 disposed thereon. Thus, the item 14 can be removed from the pad 10 without the pad sticking to the item or being removed from the surface 16.

The frictional holding pad 10 can be flexible and capable of bending (indicated at 23 in FIG. 2) to conform to curves or details in the surface 16. The frictional holding pad 10 also can have a planer configuration and can be used on planar surfaces. The frictional holding pad 10 can be provided in an original planar configuration, supported by a paper backing or release layer 24. The release layer 24 prevents or resists the pad 10 or lower surface 22 from sticking or clinging to any wrapper or packaging of the pad. The release layer 24 may be stiffer than the pad to maintain the pad in a planar configuration. In addition, the release layer 24 can include indicia thereon, such as instructions for use and care of the pad. The release layer 24 can include a tab 25 protruding therefrom beyond a perimeter of the pad 10 to facilitate removal of the release layer from the pad. Upon removal of the release layer 24, the pad 10 is flexible to enable conformity with a wide array of curved surfaces. In addition, removal of the release layer 24 exposes the lower surface 22 of the pad to be disposed on the surface 16. A removable wrapper 26 can be formed around the pad 10 and the backing layer 24 to protect the pad prior to use. The wrapper 26 and backing layer 24 can be removed prior to placing the pad on the surface 16.

The upper surface 20 of the pad 10 can be non-chemically adhered to items 14 placed thereon. Like the bottom surface 22, the upper surface 20 can be "tacky", such that the pad 10 tends to cling to the item 14 in a mechanical fashion, as opposed to a chemical or adhesive manner. As stated above, the upper surface 20 can be contoured to include protrusions 30 and/or indentations 32. The protrusions 30 and indentations 32 can be rounded or curvilinear to form a more gradual transition between the protrusions and indentations, and create a contour on the upper surface 20 that is wavy or with a more natural appearance, creating a leather-like texture that can match the surface 16. The contour of the surface 20 creates an uppermost surface on the tops of the protrusions 30 that contacts the item 14. The upper or uppermost surface 20 thus has less surface area in contact with the item 14 than the lower surface 22 has in contact with the surface 16. Thus, a greater clinging force is exerted on the item 14 than on the surfaced 16 such that the item 14 can be removed from the pad 10 or upper surface 20 without removing the pad from the surface 16. In addition, the item 14 can be smaller than the pad itself, thus also contributing to less surface contact between the upper surface 20 and the item 14.

Figure 5:
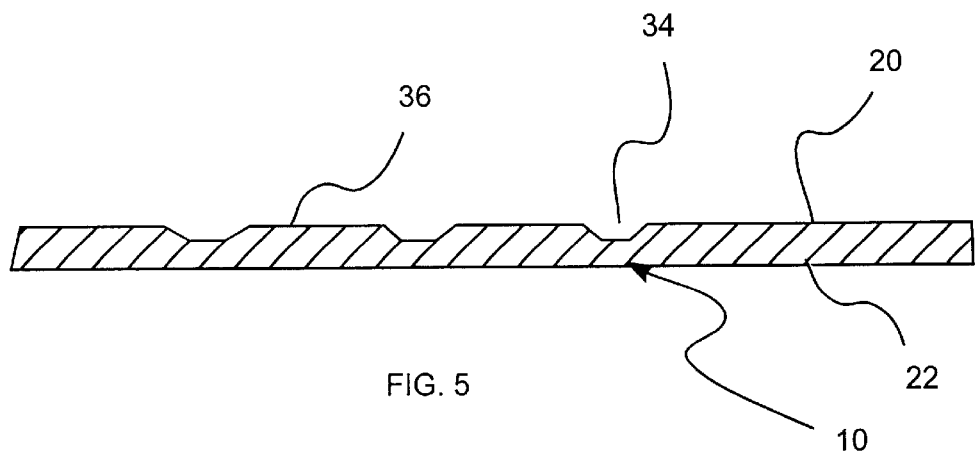
FIG. 5 is a detailed cross-sectional view of the frictional holding pad of FIG. 1.

Referring to FIG. 5, an array or matrix of a plurality of indentations 34 can be formed in the upper surface 20 of the pad 10 creating a plurality of protrusions 36 therebetween. The indentations 34 and protrusions 36 can be more straight, linear or recta-linear to create a more modern appearance.

The pad 10 can be formed of or can include an expanded vinyl material. It has been found that the expanded vinyl material provides a good frictional or "tacky" quality that remains disposed on the surface, and that retains the items thereon. In addition, it has been found that such an expanded vinyl material typically can be disposed on the surface 16 without marring or otherwise chemically interfering with the material of many surfaces, such as vehicle dashboards. It will be appreciated that many surfaces, such as a vehicle dashboard, have a finished surface configured to be aesthetically pleasing and luxurious. Such surfaces can be formed of a plastic or leather material, and can be expensive to replace or repair. In addition, it will be appreciated that some surfaces are subjected to extreme condition, such as heat and sunlight. It has been found that the expanded vinyl material not only provides the required retention of objects and fixed relationship with the surface, but also typically does so without chemically interacting with the material of surface, or otherwise damage the surface.

The expanded vinyl material of the frictional holding pad 10 forms a temporary non-chemical bond with both 1) the items 14 stored on the upper surface 20, and 2) the surface 16. The pad 10 can be removed from the surface 16 without leaving behind any residue and without damaging the pad. In this manner the pad 10 can be easily moved to any location the user desires. Because the pad is made from expanded vinyl, it can be easily cleaned with soap and water, and still retain its tackiness, and is thus reusable.

The expanded vinyl material more specifically can include: diisodecy/phlthalate; polymeric plasticer; a UV stabilizer; a vinyl hear stabilizer; a blowing agent for vinyl plastisol; and vinyl resin (plastic). The expanded vinyl material can have a weight between approximately 10 and 20 ounces per square yard; more preferably between approximately 12 and 18 ounces per square yard; and most preferably between approximately 14 and 16 ounces per square yard. The frictional holding pad 10 can have a thickness between approximately 0.03 and 0.09; more preferably between approximately 0.04 and 0.08 inches; and most preferably between approximately 0.05 and 0.06 inches.

The frictional holding pad 10 can be formed of different layers with different materials. For example, the pad 10 can have a skin layer 40 formed on the bottom surface 22 formed of a different material than the rest of the pad. For example, the material of the skin layer 40 can include: aqua ammonia ($NH_4OH$); azardine; rubber; color; and body for thickening. The skin layer 28 can have a thickness between 0.003 and 0.006 inches, and more preferably between 0.004 and 0.005 inches.

In addition, a perforated pattern can be formed in the pad 10 to give the impression of a stitching. For example, a plurality of holes 44 can be formed around a perimeter of the pad near the edge to give the appearance of a stitched edge that can be more visually consistent with the surface 16. The pad 10 can be die cut from a larger sheet of material. The perforated pattern can similarly be formed by a die.

The frictional holding pad 10 also can include indicia 52 formed on the upper surface 20. The indicia 52 can be formed by ink, or ink-like materials, printed on the upper surface. The indicia 52 can include: a logo, an advertisement, an instruction, a promotion, a company name, and a product name. Thus, the frictional holding pad 10 can be used as a promotional item by including a business or product logo or name. It will be appreciated that such frictional holding pads can be inexpensively manufactured, and in use, can occupy a position of high and frequent visibility. Thus, such frictional holding pads can be inexpensively manufacture, and given away as promotional items. In addition, the indicia 52 can include instructions that can be related or unrelated to the use or care of the pad. For example, the instructions can include how to use or place the pad, and how to clean or wash the pad. As another example, the instructions can relate to the use of something other than the pad itself, such as an item to be disposed thereon. Thus, the pad serves dual functions, both as a frictional holding pad to secure and item, and providing ready instructions. The instructions can relate to the use of the item to be disposed thereon. Thus, such a pad can be provided with an item, or provided for use with such an item. For example, the instructions can relate to the use of a cellular phone. In addition, the indicia can include warning, such as warning not to drive while talking on the phone.

Figure 6:
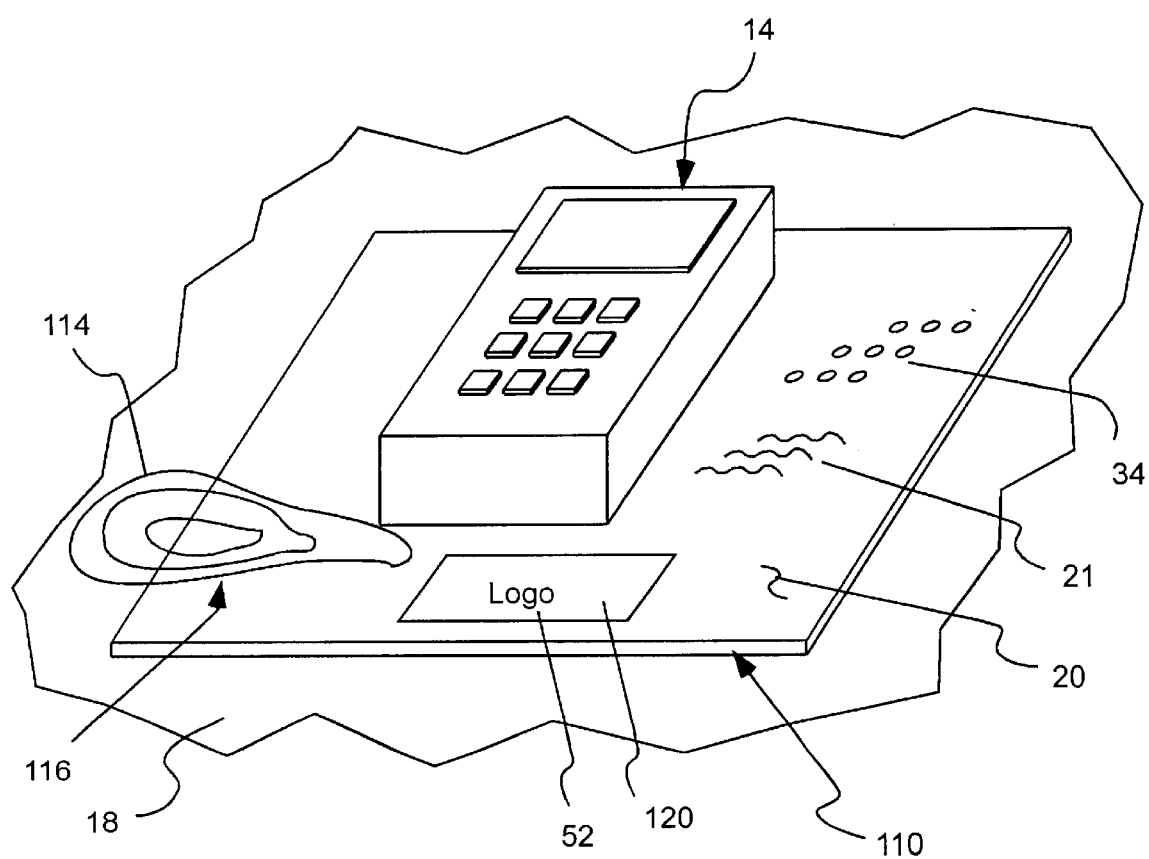
FIG. 6 is a cross-sectional view of another frictional holding pad in accordance with another embodiment of the present invention, shown disposed on a dashboard of a vehicle and with a cellular phone disposed thereon.

Referring to FIG. 6, another frictional holding pad, indicated generally at 110, is shown which is similar in many respects to the frictional holding pad described above and shown in the other drawings. The pad 110 can be translucent or transparent. Thus, surface details 114 on the surface 16 can be viewed or are visible through the pad 110 (indicated at 116 in FIG. 6). The translucent or transparent nature of the pad 110 can make the pad blend-in or match the surface 16 because of the surface details 114 showing through the pad. If the pad is translucent, it can also include a light coloring. Such coloring can help visually distinguish the pad 110 from the surface 16. Thus, a translucent pad can both blend with the surface while still being visually distinguishable therefrom.

The pad 110 can be formed of, or can include, a translucent or transparent material. For example, the pad 110 can include a molded polyurethane material. It has been found that the polyurethane material provides both a frictional or "tacky" quality that remains disposed on the surface, and that is transparent or translucent. In addition, the polyurethane material can be easily cleaned with soap and water.

The pad 110 also can include indicia 52 formed thereon. The indicia 52 can be formed on the bottom surface 22 of the pad 110 and still be visible because the pad is translucent or transparent. Forming the indicia 52 on the bottom surface 22 of tie pad can also protect the indicia from wear or removal.

The pad 110 also can include a printable portion or section 120 that can include a substantially flat area on the upper surface 20. Thus, the upper surface 20 can be substantially contoured, but still have a flat printable portion or section 120 for indicia 52.

The pad 110 preferably has a low profile, or is thin, having a thickness of less than approximately ⅛th of an inch. Thus, the items 14 are kept close to the surface 16 without extending where they might interfere with the operation of the vehicle.

Thus, the pad 110 can be a thin sheet of polyurethane material with a substantially smooth and continuous lower surface 22 with a tacky characteristic to non-chemically and removably adhere to the surface 16, and a contoured upper surface 20 also with a tacky characteristic to non-chemically and removably adhere to an item The pad or polyurethane material can be translucent or transparent, and can include printing on either the upper or lower surface.

The frictional holding pads described above can be sized and shaped to match the desired surface. For example, the pads can be sized to receive the above identified objects thereon, and to fit on typical dash boards. As an example, a size less than seven inches has been found to be useful. In addition, the pads can be sized or shaped to match other designs, such as logos.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A frictional holding device configured to be disposed on a vehicle surface and to receive and secure an item thereon, the device comprising:
    a) a pad having a bottom configured to be disposed on the vehicle surface, and a top configured to removably receive the item thereon;
    b) the top having an uppermost contact surface configured to contact and frictionally cling to the item;
    c) the top surface including a plurality of indentations and protrusions, the protrusions having an upper surface area to form the uppermost contact surface;
    d) the bottom having a lowermost contact surface configured to contact and frictionally cling to the vehicle surface;
    e) the bottom of the pad being substantially flat; and
    f) the lowermost contact surface having a greater surface area than the uppermost contact surface.

2. A device in accordance with claim 1, wherein the pad is bendable and includes a flexible material configured to conform the pad to changes in the vehicle surface.

3. A device in accordance with claim 1, wherein the bottom surface of the pad is tacky; and wherein the top surface is less tacky than the bottom surface.

4. A device in accordance with claim 1, wherein the bottom surface of the pad is smoother than the top surface.

5. A device in accordance with claim 1, further comprising:
    a plurality of holes, formed around at least a portion of a perimeter of the pad.

6. A device in accordance with claim 1, further comprising:
    indicia, formed on the top surface of the pad, the indicia being selected from the group consisting of: a logo, an advertisement, an instruction, a promotion, a company name, and a product name.

7. A device in accordance with claim 1, wherein the top surface includes at least two sections, including a first section that is substantially flat and has indicia thereon, and a second section that is contoured and configured to receive the item thereon.

8. A device in accordance with claim 1, further comprising:
    a removable backing layer, removably coupled to the bottom surface of the pad.

9. A device in accordance with claim 8, further comprising:
    a removable wrapper, formed around the pad and the backing layer, the removable backing layer resisting the bottom surface of the pad from coupling to the wrapper.

10. A device in accordance with claim 1, wherein the pad includes an expanded vinyl material.

11. A device in accordance with claim 1, wherein the pad includes a polyurethane material.

12. A device in accordance with claim 1, wherein at least a portion of the pad is at least translucent.

13. A device in accordance with claim 12, further comprising indicia, formed on the bottom surface of the pad, and visible through the at least a portion of the pad that is at least translucent.

14. A device in accordance with claim 1, wherein the frictional holding pad has a width less than approximately 7 inches, a length less than approximately 7 inches, and a thickness less than approximately ¼ inch.

15. A frictional holding device configured to be disposed on a vehicle surface and to receive and secure an item thereon, the device comprising:
    a) a pad having a bottom configured to be disposed on the vehicle surface, and a top configured to removably receive the item thereon;
    b) the top having a contoured top surface configured to contact and frictionally cling to the item;
    c) the top surface including a plurality of indentations and protrusions;
    d) the bottom having a smooth bottom surface configured to contact and frictionally cling to the vehicle surface; and
    e) the bottom surface being smoother than the top surface.

16. A device in accordance with claim 15, wherein the contoured top surface has an uppermost surface area less than a surface area of the bottom surface.

17. A device in accordance with claim 15, wherein the pad is bendable and includes a flexible material configured to conform the pad to changes in the vehicle surface.

18. A device in accordance with claim 15, wherein the bottom surface of the pad is tacky; and wherein the top surface is less tacky than the bottom surface.

19. A device in accordance with claim 15, further comprising:
    a plurality of holes, formed around at least a portion of a perimeter of the pad.

20. A device in accordance with claim 15, further comprising:
    indicia, formed on the top surface of the pad, the indicia being selected from the group consisting of: a logo, an advertisement, an instruction, a promotion, a company name, and a product name.

21. A device in accordance with claim 15, wherein the top surface includes at least two sections, including a first section that is substantially flat and has indicia thereon, and a second section that is contoured and configured to receive the item thereon.

22. A device in accordance with claim 15, further comprising:
   a removable backing layer, removably coupled to the bottom surface of the pad.

23. A device in accordance with claim 22, further comprising:
   a removable wrapper, formed around the pad and the backing layer, the removable backing layer resisting the bottom surface of the pad from coupling to the wrapper.

24. A device in accordance with claim 15, wherein the pad includes an expanded vinyl material.

25. A device in accordance with claim 15, wherein the pad includes a polyurethane material.

26. A device in accordance with claim 15, wherein at least a portion of the pad is at least translucent.

27. A device in accordance with claim 26, further comprising indicia, formed on the bottom surface of the pad, and visible through the pad.

28. A device in accordance with claim 15, wherein the frictional holding pad has a width less than approximately 7 inches, a length less than approximately 7 inches, and a thickness less than approximately ¼ inch.

29. A frictional holding device configured to be disposed on a vehicle surface and to receive and secure an item thereon, the device comprising:

a) a pad having a bottom configured to be disposed on the vehicle surface, and a top configured to removably receive the item thereon;

b) the top having a contoured top surface with a plurality of indentations and protrusions, the plurality of protrusions having an uppermost contact surface configured to contact and frictionally cling to the item;

c) the bottom having a lowermost contact surface configured to contact and frictionally cling to the vehicle surface;

d) the bottom of the pad being substantially flat and being smoother than the top surface; and e) the lowermost contact surface having a greater surface area than the uppermost contact surface.

* * * * *